April 22, 1969     U. W. LUDWIG     3,439,982
OPTICAL INSETTING
Filed Dec. 20, 1967
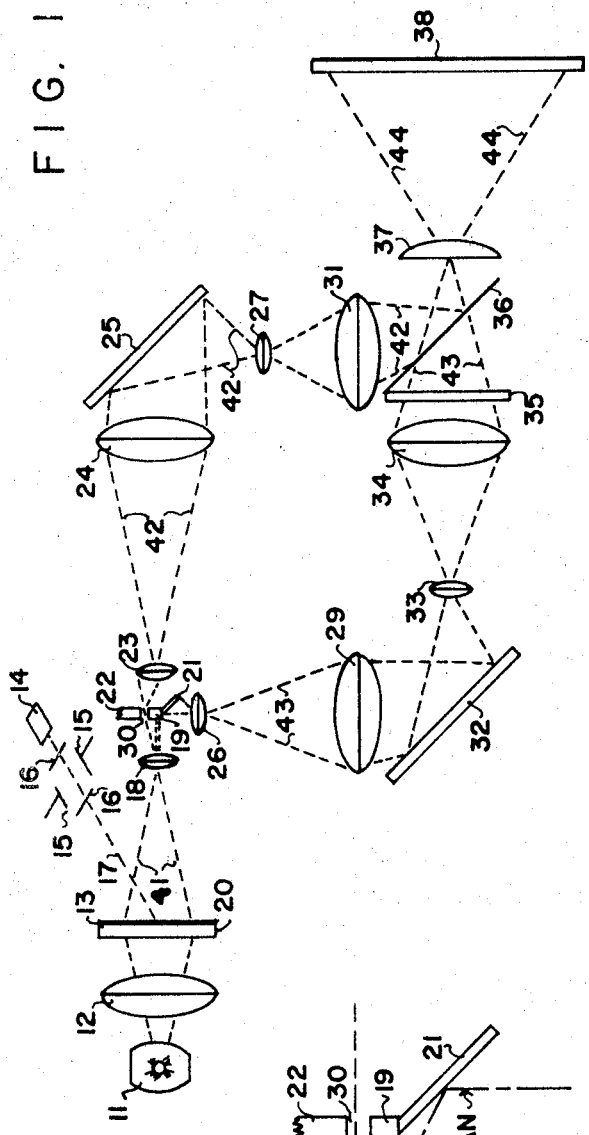
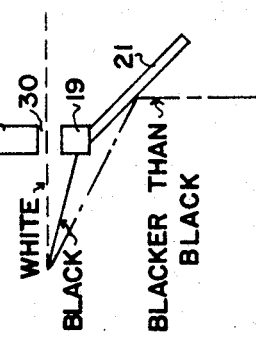
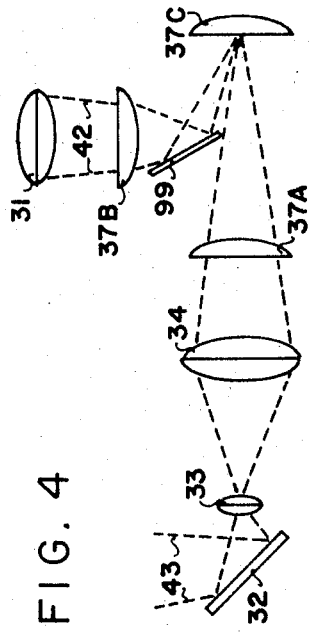
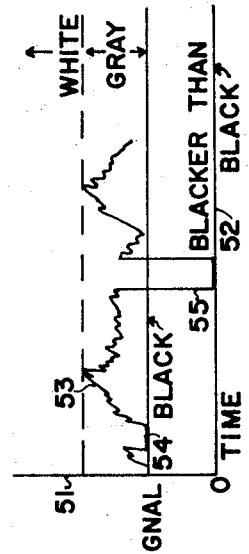
INVENTOR.
URBAN W. LUDWIG
BY
William Grolman United States Patent Office 3,439,982
Patented Apr. 22, 1969

3,439,982
OPTICAL INSETTING
Urban W. Ludwig, Beltsville, Md., assignor to General Precision Systems, Inc., Binghamton, N.Y., a corporation of Delaware
Filed Dec. 20, 1967, Ser. No. 692,038
Int. Cl. G03b 21/26
U.S. Cl. 353—34
9 Claims

ABSTRACT OF THE DISCLOSURE

A system for producing an inset of a portion of one picture into another by optical components. The system utilizes a schlieren system for producing two light paths from a single light pattern. Each of the two paths is a complement of the other, the two paths together making up a whole image projected upon a screen. Any type of image forming schlieren optical system can be used, but the one described utilizes an electro-plastic film which is deformed by means of a cathode ray. With no deformation, light from a light source is reflected along a first path and is applied through film transparency to project an image onto a screen. When the cathode beam strikes the electro-plastic film, the film is puckered or distorted by the beam, and the light is then deflected from its normal path into a second path. The light which is deflected from its normal path leaves a blank spot in the image formed in the normal path. Also, if a film transparentcy is placed in the second path, then the image of the second film transparency will have the exact shape of the blank spot formed in the first image. The two can be combined on a single screen to form a single composite image.

---

This invention relates to optical systems and, more particularly, to systems for optically providing a blank spot in a first image and a corresponding second image having the same shape of said blank spot to form a single composite image.

Insetting is not new. It was photographically performed (and still is to some extent) in commercial motion pictures. Some of the primary large-scale insetting projects which have been achieved were those which resulted in the motion pictures which combined animated cartoon characters and photographs of living persons. This type of insetting is accomplished by the superposition of one photographic film upon another to form a single film having the desired composition. When the work can be performed leisurely and the results do not change appreciably with time, this type of insetting can be accomplished with great skill to produce realistic results.

Another form of insetting is accomplished electronically during television programs. In this type of operation, the electrical signals representative of two separate pictures are simultaneously generated by two separate television cameras. Portions of these two separate pictures can be electrically combined in an electronic console to produce a single composite display. The electronic combinations of portions of two separate pictures permits rapid and ready changes in the overall composite and even permits rapid substitution of other images from other sources. However, the electronic combination of two images often leaves clear lines of demarcation, and does not produce realistic results. One reason for the boundary lines of the insetted image is the difficulty in achieving correct and true alignment.

Insetting is also produced in color printing where a red image may be printed over a blue image, and in which a yellow image may be over printed on the other two. The results of improper registration or slight deviations in pattern in color printing have been clear to all. This is probably the most common form that incorrect insetting takes.

There are many fields in which it is desirable to project an image which has been stored, for example on a photographic film, and to add to that image, or to insert into that image, a portion of another image. At the same time these situations often require the ability to continually change the pattern of both the primary and the inset image and still produce as realistic a display as possible. Several difficulties or disadvantages are inherent in each of the systems discussed above. The photographic system mentioned above requires a substantial amount of time in order to produce the composite film with the inset image, and this final film is not subject to further modifications. The television system, while permitting continuing change, requires a large amount of complex electronic equipment and does not produce very plausible results. The disadvantages of printed matter are obvious. Printed matter is a form of permanent recording and is not subject to change. In addition, its use is feasible and economically justifiable only when a large number of copies are desired. The system of this invention overcomes these disadvantages.

It is an object of this invention to provide a new and improved system for insetting a portion of one image into another.

It is another object of this invention to provide a new and improved system for insetting a portion of one image into another image while leaving the entire procedure available for rapid and simple change.

It is a further object of this invention to provide a new and improved system for achieving the insetting of one image into another by optical means.

It is still a further object of this invention to provide a system for insetting a television image in a photographic projection.

It is still another object of this invention to provide a new and improved system for insetting a portion of one image into another in a simple manner which is very versatile and can be modified easily.

Other objects and advantages of this invention will become apparent to those skilled in the art as the following description proceeds, which description should be considered together with the drawings in which:

FIG. 1 is a schematic showing of the system of this invention,

FIG. 2 is an enlarged view of a portion of FIG. 1,

FIG. 3 is a curve showing a typical video signal with appropriate identification of its four major parts, and FIG. 4 is a schematic showing of a modification of the system of FIG. 1.

Referring now to the drawings in detail and more particularly to FIG. 1, the reference character 11 designates a light source, preferably a point light source. The light from the light source 11 is passed by a field lens 12 to fall upon a schlieren plate 13 having a deformable plastic sheet 20 on one surface. A cathode ray device comprising a cathode gun 14 and two pairs of deflection plates 15 and 16 generates a beam of electrons shown on FIG. 1 by the line 17 which impinges upon the plastic sheet 20. The plate 13 and the sheet 20 are transparent and the light from the source 11 passes through them, as represented by the dashed lines 41, and through a relay lens 18 to impinge upon an opaque bar or plate 19. A mirror 21 is affixed to the bottom part of the bar 19 and at an angle of 45 degrees with an axis of the system. A stop 22 together with the bar 19 forms a pupil or aperture through which light can pass. Light passing through the aperture is transmitted by a relay lens 23 as represented by the dashed lines 42 and is focused on a field lens 24. A mirror 25 is placed at an angle of 45 degrees with the optical axes of the lenses 23 and 24 and reflects the image focused on the image plane of the lens 24 through a relay lens 27 and onto field lens 31. A second mirror 36 projects the image from the lens 31 as represented by the dashed line 42 through a projection lens 37 onto a screen 38. On the other hand, light which strikes the mirror 21 is reflected by that mirror along the path represented by the dashed lines 43 through a relay lens 26 which focuses it on a field lens 29. The light from the lens 29 strikes a mirror 32 and is reflected through a relay lens 33 onto a field lens 34. A photographic transparency 35 or the like is placed before the lens 34 so that the light from the lens 34 passes therethrough and the image from the transparency 35 is projected through the half-silvered mirror 36 and the lens 37 onto the screen 38.

From the structure shown in FIG. 1, the image appearing on the screen 38 is a composite image formed of the light along path 42 and also the light along path 43. The projection lens 37 combines the image along path 42 reflected by the half-silvered mirror 36 and the image along path 43 which passes through the half-silvered mirror 36. The image which is formed on the screen 38 comprises the two separate images, one inset in the other rather than one being superimposed on the other. The type of image contemplated, although by no means as versatile as the image of this invention, is the type of image shown in the U.S. Patent to F. Fulgora, 1,806,452. One of the troubles with the Fulgora type of device is that the registration of the two images has to be exact and this is made more difficult because the shape of the two images and their sizes are fixed and predetermined. This invention overcomes this type of disadvantage.

In normal use, the electron gun 14 and the deflecting plates 15 and 16 operate together as a flying spot scanner with the intensity of the beam 17 being varied in accordance with a video signal. As the beam 17 sweeps across the sheet 20 causing the sheet 20 to distort physically in proportion to the intensity of the beam, some rays of light from the source 11 are refracted, and instead of passing through the plate 13 and the sheet 20 and being focused by the lens 18 into the mirror 21, the light is caused to pass through the pupil 30 or to strike the bar 19. The light that passes through the pupil 30 is the light 42 whose path has been described above. The light which is reflected from the mirror 21 is the light 43 whose path has been described above. Thus, the path that the light from the source 11 takes at any instant depends upon the beam 17.

The video signal, which may be any video signal from any source whatsoever and need not be described in greater detail in this application, is coordinated with the sweep signals which are applied to the deflection plates 15 and 16 (the deflection potentials are also old in the art and need not be further described in this application). Thus, the electron beam 17 is projected toward the screen 20 and is made to scan the screen in any suitable manner determined by the voltages applied to the deflection plates 15 and 16. As the beam scans the sheet 20, its intensity is varied in accordance with the video signal applied to the gun 14. Thus, as with a television signal on the face of a television tube, the strength of the electron beam 17 varies from point to point on the sheet 20. The application of the beam 17 to any point on the sheet 20 produces a variation in the flatness of the sheet 20. When the sheet 20 is perfectly flat, the light from the source 11 passes straight through the plate 13 and the sheet 20 and is focused by the lens 18 onto the mirror 21. When the sheet 20 is puckered slightly at any point, the light from the source 11 is refracted and bent so that the lens 18 no longer focuses the light onto the mirror 21 but now focuses the light onto the opaque bar 19. This can be better seen from FIG. 2 which is an enlarged view of the bar 19, mirror 21 and pupil 30.

When the sheet 20 is puckered to a greater extent, the light from the source 11 passing through that point on the sheet 20 is focused by the lens 18 through the pupil 30 and through the lens 23 onto the mirror 25. Thus, the sheet 20 at any point has a flatness which is determined by the strength of the beam 17 when it strikes that point. The stronger the beam 17, the more the sheet 20 is puckered at that point and the greater the deflection of the light from the mirror 21 upward toward the pupil 30. In this manner, the video signal can control the beam 17 as it is deflected across the sheet 20 to "paint" a picture on the sheet 20 in varying amounts. The light from the source 11 illuminates the entire sheet 20 and causes the light from the those portions which have the least pucker to strike the mirror 21 and from those points with the most pucker to pass through the pupil 30. That portion of the light from the source 11 which strikes the mirror 21 can be considered to be a blank portion of the image which appears on the mirror 25 after passing through the pupil 30. The amount of light which passes through the pupil depends upon the extent to which the light is bent upwardly from the bar 19, so that from one point on the sheet 20, all of the light passing through the point can also pass through the pupil 30, whereas from another point on the sheet 20, only a portion of the light may pass through the pupil 30—the rest being blocked by the bar 19. Thus, the cathode beam 17 from the gun 14 can actually affect the sheet 20 so that the light 42 being transmitted to the mirror 25 and the mirror 36 onto the screen 38 is an actual picture similar to that appearing on a television screen. Assuming, for this discussion, that when all of the light passes through the pupil 30, this represents a white signal, and when all of the light from any point is obliterated by the bar 19, this represents a black signal, then the grays are those signals where some of the light passes through the pupil 30. On the other hand, the light which is undeflected and thereby strikes the mirror 21 is blacker than black. The type of signal described is schematically shown in FIG. 3 where one axis 51 increases vertically and depicts signal strength and the other axis 52 represents time. The curve of FIG. 3 can be considered in three separate portions. Most of the curve, labeled 53, represents signals having a strength which is variable in the gray area, the higher amplitude signals approaching white and the lower amplitude signals approaching black. One portion of the curve is shown at 54 to be a black signal where there is virtually no light on the screen 38. A third portion of the signal, shown at 55, is that portion of the signal which is blacker than black, and this results in the light 43 being reflected from the mirror 21.

As a practical matter, the signals which are in the black, gray, and white areas are all portions of a video image. That portion of the signal which is blacker than black represents a hole in that video image. Thus, whenever light strikes the mirror 21, that light does not help form the video image which is reflected by the mirror 25 and is represented by the light path 42. On the other hand, that light passes through a second light path 43 which includes a transparency 35, either still or moving. Since the shape and size of the portion of the light wihch is reflected by the mirror 21 is the same shape and size as the hole formed in the video image along path 42, the two images can be superimposed so that the light 43 provides an inset for the image formed along the path 42.

This raises the question of registration of the two images. Registration is always a problem in the situation of this type, and the apparatus disclosed herein must be mounted on suitable supports and bases to permit the necessary adjustment to accomplish the proper registration of the two images. Since the inset image is carved out of the original image by use of the schlieren system, registration is somewhat simplified in this apparatus over most similar equipment since the blanked out portions and the inset image are of identical shape.

It should be noted from a review of FIG. 1 that the lens 12 and the lens 37 are both common to both light paths. In the system of FIG. 1 the lenses 12, 29 and 34 are field lenses in one path and lenses 12, 24 and 31 are field lenses in the second path. The projection lens 37 is also a field lens. Relay lenses along the path 43 are the lenses 18, 26 and 33 and along path 42 are lenses 23 and 27. In order to achieve two separate images in which one image is the same size as the blanked out portion of the other image, it is necessary that the two light paths be the same length. In addition, the two sets of lenses used should be substantially identical. The image of the light passing through the sheet 20 is focused by the two relay lenses 18 and 26 onto the image plane of the field lens 29. Similarly, the image of the light passing through the sheet 20 is also focused by the relay lenses 18 and 23 along the path 42 into the image plane of the field lens 24. The image in the image plane of the field lens 29 is reflected by the mirror 32 and focused by the relay lense 33 onto the image plane of the field lens 34. The image in the plane of the field lens 24 is reflected by the mirror 25 and focused by the relay lens 27 onto the image plane of the field lens 31. The images in the image plane of the field lenses 31 and 34 are recombined in the projection lens 37 to form the composite image which is focused upon the screen 38. Thus, the two light paths are essentially the same in construction and in length so that the final image which appears on the screen 38 is formed of two portions which have been processed identically. If an Eidophor system is used instead of the plate 13 and the sheet 20, the light from the source 11 is variably reflected in response to the applied signals instead of being variably refracted.

The field lenses 12, 24, 31, 29 and 34 comprise a set of lenses which relay the image of the length source 11, either deflected or underflected, through the system. The image lenses 18, 23 and 27 comprise a set of lenses which relay the black-gray-white schlieren image through the system to the projection lens 37. The image lenses 18, 26 and 33 relay the image of the blacker than black areas to the transparency 35 for projection by the lens 37 onto the screen 38.

A modification of the overall system is shown in FIG. 4. Those lenses and mirrors which are unchanged from the system of FIG. 1 bear the same reference characters. Thus, light 43 from the mirror 21 of FIG. 1 is reflected by the mirror 32 to the image lens 33 which transmits the image of the blacker than black areas through the field lens 34. Similarly, the light 42 from the mirror 25 passes through the field lens 31. In this modification, the projection lens has been divided into three parts, 37A, 37B and 37C. Light from the field lens 34 passes through the projection lens system comprising lenses 37A and 37C. Light from the field lens 31 passes through the projection lens system comprising lenses 37B and 37C, the image from the lens 37B being reflected by a mirror 99. The two images are combined in the lens 37C. The three lenses 37A, 37B and 37C are substituted for the projection lens 37 of FIG. 1 and the full mirror 99 is substituted for the semitransparent mirror 36. That light which is reflected from mirror 21 passes by the mirror 99, and that light which passes by the mirror 21 is reflected by the mirror 99. The components are arranged so that the light 42 and the light 43 in the two light paths are treated alike.

The above specification has described a new and improved system for insetting the image from a film transparency into a television image. The system of this invention provides an inset image size and shape which is identical to the blanked out portion of the image into which it is being inset. It is realized that the above description may indicate to those in the art additional ways in which the system of this invention may be used without departing from its principles. It is, therefore, intended that this invention be limited only by the scope of the appended claims.

What is claimed is:

1. An optical system for providing two images one of which is inset in the other, said system comprising a source of light, a transparent variable light-refractive means situated to be irradiated with light from said source, means for selectively controlling the instantaneous light refractive properties of said light-refractive means from point to point, means forming a light aperture, a first mirror immediately adjacent said aperture, said aperture and said first mirror being so situated that light passing through points on said refractive means having low refraction strike said first mirror and light passing through points on said refractive means which have higher refraction passes through said aperture in amounts proportional to the amount of refraction of said refractive means, a first light transmission path for transmitting light reflected by said first mirror, a second light transmission path for transmitting light passing through said aperture. Means in said first light path for modifying the light passing therethrough, and means for displaying an image which is the composite of those transmitted by said first and second paths.

2. The system defined in claim 1 wherein said first and second light transmission paths are of substantially the same length and have substantially identical light transmitting characteristics.

3. The system defined in claim 2 wherein said means for displaying a composite image comprises a projection lens in which the images transmitted by said first and second transmission paths are combined, and a screen upon which the images combined in said projection lens is projected.

4. The system defined in claim 1 wherein said light-refractive means comprises a schlieren system in which the refractive index at any point in the schlieren medium is selectively controlled by an outside means, and wherein said outside means comprises said selective control means.

5. The system defined in claim 4 wherein said schlieren medium comprises a plastic sheet and wherein said selective control means includes a cathode ray generator and means for controlling the cathode ray so that it impinges upon said sheet at selected locations.

6. An optical system for providing a composite image which is formed of one image inset into another image, said system compirsing a source of light, a light transmission medium situated to be irradiated by light from said source and having selectively variable light densities, means forming a light aperture, a first mirror situated immediately adjacent said aperture, means for controlling the light density of said transmission medium from point to point, a first lens so situated that it directs light passing through said transmission medium at a point where the density is at a minimum to said first mirror and light passing through said medium at points where the density is greater than medium to said aperture so that the amount of light passing through said aperture varies from point to point in proportion to the point to point density of the medium, a first light transmission path for transmitting the light image passing through said aperture, a second light transmission path for transmitting the light reflected by said first mirror, means in said second transmission path for modifying the light being transmitted therethrough, and means for combining the light image transmitted by said first path and the light transmitted by said second path to form a single composite image.

7. The system defined in claim 6 wherein said means for controlling the point to point density of said medium includes means for sweeping said medium in a regular manner to establish a pattern of light densities in said medium such that light passing therethrough forms an image, and wherein the light transmitted through the first transmission path is a representation of the image in said medium with a blank portion therein and the light transmitted by the second transmission path is from the blank portion of image in said medium.

8. The system defined in claim 7 wherein said light modifying means in said second transmission path comprises an image forming device so that the combined image from said first and second paths comprises the image in said medium with a blank area and another image created in said second path and filling said blank area.

9. An optical system for providing two images one of which is inset in the other, said system comprising a source of light, a light reflective means having selectively variable reflective angles and being situated to be irradiated with light from said source, means for selectively controlling the instantaneous reflective angle of said light-reflective means from point to point, means forming a light aperture, a first mirror immediately adjacent said aperture, said aperture and said first mirror being so situated that light being reflected by points on said reflective means having low reflective angle variation strike said first mirror and light reflected from points on said reflective means which have higher reflective angle variation passes through said aperture in amounts proportional to the amount of reflective angle variation of said reflective means, a first light transmission path for transmitting light reflected by said first mirror, a second light transmission path for transmitting light passing through said aperture, means in said first light path for modifying the passing therethrough, and means for displaying an image which is the composite of those transmitted by said first and second paths.

References Cited

UNITED STATES PATENTS

| | | | |
|---|---|---|---|
| 2,740,830 | 4/1956 | Gretener | 88—24 |
| 2,943,147 | 6/1960 | Glenn | 350—161 XR |
| 3,134,297 | 5/1964 | Carlson et al. | 88—24 |
| 3,272,917 | 9/1966 | Good et al. | 178—5.4 |

NORTON ANSHER, *Primary Examiner.*

R. P. GREINER, *Assistant Examiner.*

U.S. Cl. X.R.

178—5.4; 346—77